United States Patent [19]

Barraclough et al.

[11] 4,091,028

[45] May 23, 1978

[54] PRODUCTION OF PHTHALOCYANINE GREEN

[75] Inventors: Ronald Barraclough, Johnstone; Robert Langley, Glasgow, both of Scotland

[73] Assignee: Ciba-Geigy Corporation, Ardsley, N.Y.

[21] Appl. No.: 712,577

[22] Filed: Aug. 9, 1976

[30] Foreign Application Priority Data

Aug. 16, 1975 United Kingdom ............... 34196/75

[51] Int. Cl.$^2$ ............................................. C09B 47/10
[52] U.S. Cl. ................................................. 260/314.5
[58] Field of Search ..................................... 260/314.5

[56] References Cited

U.S. PATENT DOCUMENTS 2,662,085  12/1953  Holtzman et al. ................ 260/314.5

OTHER PUBLICATIONS

Moser et al., Phthalocyanine Compounds, Pates 177–179 & 184, Reinhold Pub. Corp., NY (1963).

Primary Examiner—Richard L. Raymond
Attorney, Agent, or Firm—Vincent J. Cavalieri

[57] ABSTRACT

A process for the production of halogenated copper phthalocyanine by heating a mixture of dry crude copper phthalocyanine, an organic solvent, a halogenating agent, a halogen transfer agent and, as catalyst, chlorosulphonic acid.

16 Claims, No Drawings

PRODUCTION OF PHTHALOCYANINE GREEN

The present invention relates to the production of phthalocyanine green pigments.

It is well-known that the shade of copper phthalocyanine varies according to the number of chlorine atoms present in the molecule. Thus the blue shade of the unchlorinated copper phthalocyanines changes to green-blue when eight chlorine atoms are introduced and to a highly sought after intense yellow green shade when 15 to 16 chlorine atoms are incorporated into the copper phthalocyanine molecule.

In the past, a very great number of attempts have been made to attain the goal of producing fully chlorinated copper phthalocyanine. Those attempst have generally been relatively unsuccessful, either in absolute terms or in the context of commercial feasibility, because of the practical difficulties surrounding the chlorination reaction involved. In an article published in Zhur. Prik. Khim 29, 1487–91(1956) Borodkin and Usacheva have described some of the problems encountered in chlorinations of copper phthalocyanine carried out in solvent systems. These Russian workers reported that the chlorination of copper phthalocyanine in trichlorobenzene, bromonaphthalene and nitrobenzene proceeds quickly until 4 – 6 chlorine atoms per molecule have been introduced. Thereafter, the process slows down and then no chlorination occurs for a considerable period. At some point in the chlorination reaction, chlorination of the solvent begins and becomes more extensive as the reaction period lengthens. The presence of these chlorinated solvent products makes separation of the chlorinated copper phthalocyanine product from the reaction mass difficult and additional expenditure of solvent is necessary in washing clean the desired product.

We have now found a solvent halogenation process for copper phthalocyanine in which these disadvantages are avoided and which provides high yields of highly halogenated copper phthalocyanine.

According to the present invention there is provided a process for the production of highly halogenated copper phthalocyanine comprising heating, at an elevated temperature, a mixture of dry crude copper phthalocyanine, an organic solvent, a halogenating agent, a halogen transfer agent and, as catalyst, chlorosulphonic acid.

As examples of suitable organic solvents, there may be mentioned high-boiling hydrocarbons, halo and nitro derivatives thereof such as halogenated benzene derivatives e.g. mono- or polychlorobenzenes, especially 1,2,4-trichlorobenzene and most especially nitrobenzene. The amount of solvent used can be varied over a wide range since the main function of the solvent is to act as a diluent during halogenation to facilitate smooth reaction and generally to provide a fluid reaction mixture. However, the proportion of solvent in relation to the other components of the reaction mixture should not be too high, since the degree of halogenation decreases as the proportion of the organic solvent increases. In the case of chlorination reactions, a high level of chlorination may be obtained if the ratio, by volume, of organic solvent: chorosulphonic acid is maintained at 30:1. To obtain the optimum degree of halogenation of copper phthalocyanine (15–16 atoms of halogen/molecule of copper phthalocyanine), the proportion of pigment in the final reaction mixture should be from 30 to 45%, preferably from 40 to 45% by weight, based on the weight of the organic solvent.

Suitable halogen transfer agents which may be used include anhydrous iron chloride, cuprous chloride, antimony sulphide, anhydrous zinc chloride and, more preferably, metallic iron and copper and, in particular, iodine. The proportion of the halogen transfer agent in the reaction mixture is advantageously within the range of from 0.05 mole to 0.5 mole, preferably from 0.1 mole to 0.5 mole, based on one mole of copper phthalocyanine.

With respect to the halogenation agent, conventional halogenating agents may be used including chlorine, bromine, phosgene, thionyl chloride and sulphuryl chloride, as well as mixtures of two or more thereof. Preferably, however, the halogenating agent is elemental chlorine or sulphuryl chloride.

The preferred chlorinated phthalocyanine products of the process of the present invention are blue-green in shade and, if desired, products having a yellower hue may be obtained by modifying the process to include a degree of bromination.

In order to achieve the required level of chlorination of the copper phthalocyanine starting-material it is clearly essential to have present in the reaction mixture at least the stoichiometric amount of chlorinating agent necessary to produce copper phthalocyanine containing the desired number of chlorine atoms per molecule. In practice, it is preferred to use an excess amount of the chlorinating agent above the theoretical amount required, for instance, an amount of chlorinating agent of from 7 to 32 moles especially of from 20 to 32 moles, each based on one mole of copper phthalocyanine starting-material.

The amount of the chlorosulphonic acid in the reaction mixture is an important feature of the process of the present invention. It has been found that the degree of chlorination of copper phthalocyanine increases with increasing amounts of chlorosulphonic acid until an optimum amount of chlorosulphonic acid is reached, corresponding to substantially complete chlorination of copper phthalocyanine. Thereafter, further increases in the amount of chlorosulphonic acid lead to a decrease in the level of copper phthalocyanine chlorination and an increase in the level of sulphonation of copper phthalocyanine.

The amount of chlorosulphonic acid which is used in the process of the present invention will vary according to the purity of the copper phthalocyanine starting-material. The purer the copper phthalocyanine, the less chlorosulphonic acid is required. For copper phthalocyanine crude acid, which has been subjected to an acid-washing purification, it is preferred to use from 0.5 to 3.0 moles, more preferably from 0.75 to 1.25 moles, especially 1.0 mole of chlorosulphonic acid per mole of copper phthalocyanine.

It is normally convenient to carry out the process of the present invention in a stepwise manner. In a preferred process sequence, the crude copper phthalocyanine may first be slurried in the organic solvent, the chlorosulphonic acid catalyst may be added and the mixture may be heated to an elevated temperature, preferably to a temperature within the range of from 100° to 140° C, especially within the range of from 100° to 130° C, whereat the halogen transfer agent is desirably added. To this hot mixture, there then may be added gradually with stirring, the halogenating agent, over an extended period e.g. from 5 to 10 hours, whilst further heating the reaction mixture to a temperature within the range of from 150° to 190° C., preferably to a temperature within the range of from 160° to 180° C, especially to 165° to 170° C. If desired, the reaction mixture may then be heated at a temperature within the range of from 150° to 190° C for a further period e.g. from 3 to 10 hours.

The reaction mixture may be conveniently worked-up by drowning out in water, washing the organic layer with water and dilute caustic to give a clear aqueous layer, washing further by decantation and finally removing the organic solvent e.g. by steam distillation. The solid material so obtained may be then filtered off, washed until neutral and dried e.g. at a temperature of 50°–60° C.

The process of the present invention provides very high yields, e.g. 94% theory or higher, of crystalline copper phthalocyanine containing up to 15–15.5 atoms Cl and/or Br. Moreover, the solvent used in the present process suffers very little halogenation, normally less than 0.1% by weight, so that there are no problems in recovering and re-using the solvent and, furthermore, no halogenating agent is wasted in halogenating the solvent, as is the case in many prior processes.

The following Examples further illustrate the present invention. Parts and percentages shown therein are by weight unless otherwise stated. Parts by weight bear the same relation to parts by volume as do kilograms to liters.

EXAMPLE 1

60 parts by volume of freshly-distilled nitrobenzene and 17 parts of acid-washed phthalocyanine blue crude were stirred together at 20° C for 30 minutes, to give a homogenous slurry. To this slurry, there was then added 2 parts by volume of chlorosulphonic acid and the temperature of the mixture was raised to 120° C. There was then quickly added 2 parts of iodine and the whole was stirred for 20 minutes.

78 parts by volume of sulphuryl chloride were then added to the hot stirring mixture, gradually over a period of 7 hours in the following stages:

| | |
|---|---|
| start | |
| 1st hour | |
| 2nd hour | 13 parts SO$_2$Cl$_2$ |
| 3rd hour | 13 parts SO$_2$Cl$_2$ |
| 4th hour | 13 parts SO$_2$Cl$_2$ |
| 5th hour | 13 parts SO$_2$Cl$_2$ |
| 6th hour | 13 parts SO$_2$Cl$_2$ |
| 7th hour | 13 parts SO$_2$Cl$_2$ |

During the first 6 hours, the temperature of the mixture was held at 120° C but during the 7th hour, the temperature of the mixture was raised to 170° C.

After the completion of the addition of sulphuryl chloride, the reaction mixture was heated at 170° C. for a further period of 5 hours.

The hot reaction mixture was then drowned out into half its volume of water, and washed water and 10% w/v aqueous NaOH until a clear aqueous layer was obtained. The organic layer was further washed by decantation and the nitrobenzene solvent was removed by steam-distillation.

Finally, the residue was filtered, washed to neutrality and dried at 50°–60° C., to give 31.8 parts of green copper phthalocyanine containing 15–15.5 atoms of Cl, per molecule of copper phthalocyanine.

EXAMPLE 2

To 100 parts by volume of nitrobenzene, there were added 17 parts by weight of acid-washed crude phthalocyanine blue pigment. The mixture was stirred at 20° C for 30 minutes and gave a uniform slurry to which was added 2 parts by volume of chlorosulphonic acid. The temperature of the reaction mixture was raised to 120° C and then 2 parts by weight of iodine were quickly added.

78 parts by volume of sulphuryl chloride were then added gradually, with stirring, to the reaction mixture over 7 hours in the following stages:

| | |
|---|---|
| 1st hour | |
| 2nd hour | 13 p.b.v. sulphuryl chloride |
| 3rd hour | 13 p.b.v. sulphuryl chloride |
| 4th hour | 13 p.b.v. sulphuryl chloride |
| 5th hour | 13 p.b.v. sulphuryl chloride |
| 6th hour | 13 p.b.v. sulphuryl chloride |
| 7th hour | 13 p.b.v. sulphuryl chloride | p.b.v. = parts by volume

During the first 6 hours, the temperature of the mixture was held at 120° C but during the seventh hour the temperature of the mixture was raised to 170° C. After the completion of the addition of sulphuryl chloride, the reaction mixture was heated at 170° C. for a further period of 5 hours. The hot reaction mixture was then drowned out into half its volume of water and a 10% w/v. aqueous NaOH solution was added until a clear aqueous layer was obtained.

The organic layer was further washed by decantation and the nitrobenzene was removed by steam distillation. Finally, the residue was filtered, washed to neutrality and dried at 50°–60° C. to give 31.8 parts by weight of a green copper phthalocyanine pigment containing 13–14 atoms of chlorine per molecule of copper phthalocyanine.

EXAMPLE 3

The procedure of Example 2 was repeated with the exception that the amount of nitrobenzene was increased to 150 parts by volume.

In this way, 30 parts by weight of a green copper phthalocyanine pigment were obtained containing 11 atoms of chlorine per molecule of copper phthalocyanine.

EXAMPLE 4

The procedure of Example 2 was repeated except that the solvent used was 100 parts by volume of 1,2,4-trichlorobenzene.

In this way, 30 parts by weight of a green copper phthalocyanine were obtained containing 13 atoms of chlorine per molecule of copper phthalocyanine.

EXAMPLE 5

The procedure of Example 2 was repeated except that the halogen transfer agent used was 0.45 part by weight of iron powder.

There were obtained in this way 29.5 parts by weight of a green copper phthalocyanine pigment containing 11 atoms of chlorine per molecule of copper phthalocyanine.

EXAMPLE 6

The procedure of Example 2 was modified by using 0.5 part by weight of copper powder as halogen transfer agent.

In this way, there were obtained 29.5 parts by weight of a green copper phthalocyanine pigment containing 11 atoms of chlorine per molecule of copper phthalocyanine.

EXAMPLE 7

The general procedure of Example 3 was repeated but using 5 parts by volume of chlorosulphonic acid and 69 parts by weight of gaseous chlorine as chlorinating agent, the chlorine being added in the following stages:

| 1st hour | 4.0 p.b.w. $Cl_2$ |
|---|---|
| 2nd hour | 5.0 p.b.w. $Cl_2$ |
| 3rd hour | 12.0 p.b.w. $Cl_2$ |
| 4th hour | 12.0 p.b.w. $Cl_2$ |
| 5th hour | 12.0 p.b.w. $Cl_2$ |
| 6th hour | 12.0 p.b.w. $Cl_2$ |
| 7th hour | 12.0 p.b.w. $Cl_2$ | p.b.w. = parts by weight

In this way, there were obtained 31 parts by weight of a green copper phthalocyanine containing 13 atoms of chlorine per molecule of copper phthalocyanine.

EXAMPLE 8

85 parts by weight of acid-washed crude phthalocyanine blue were added to 400 parts by volume of nitrobenzene, and the mixture was stirred at 20° C. for 30 minutes to give a uniform slurry. To this slurry, there was then added 10 parts by volume of chlorosulphonic acid, the temperature of the mixture was raised to 120° C. and there were quickly added 10 parts by weight of iodine and the whole was stirred at 120° C. for 20 minutes. 10.5 parts by volume of liquid bromine were then added, dropwise, with stirring, to the mixture at 120° C. over a period of 30 minutes.

390 parts by volume of sulphuryl chloride were then added gradually to the reaction mixture, maintained at 120° C., over a period of 7 hours, in the following stages:

| 1st hour | ⎫ | |
|---|---|---|
| 2nd hour | ⎬ | 65 parts $SO_2Cl_2$ |
| 3rd hour | ⎭ | 65 parts $SO_2Cl_2$ |
| 4th hour | ) | 65 parts $So_2Cl_2$ |
| 5th hour | ) | 65 parts $SO_2Cl_2$ |
| 6th hour | ) | 65 parts $SO_2Cl_2$ |
| 7th hour | ) | 65 parts $SO_2Cl_2$ |

During the first 6 hours, the temperature of the mixture was held at 120° C., but during the seventh hour, the temperature of the mixture was raised to 170° C. After completion of the addition of sulphuryl chloride, the reaction mixture was heated at 170° C. for a further 5 hours.

The hot reaction mixture was then drowned out into half its volume of water, and washed with water and 10% weight/volume aqueous NaOH until a clear aqueous layer was obtained. The organic layer was further washed by decantation and the nitrobenzene solvent was removed by steam distillation.

Finally, the residue was filtered, washed to neutrality and dried at 50°–60° C., to give 154 parts by weight of a green copper phthalocyanine pigment containing 13 atoms of Cl and 0.5 atoms of Br per molecule of copper phthalocyanine.

We claim:

1. A process for the production of halogenated copper phthalocyanine comprising heating, at an elevated temperature, a mixture of dry crude copper phthalocyanine, an organic solvent selected from the group consisting of a high-boiling hydrocarbon, or a halo- or nitro-derivative thereof, a halogenating agent, a halogen transfer agent selected from the group consisting of anhydrous iron chloride, cuprous chloride, antimony sulphide, anhydrous zinc chloride, metallic iron, copper or iodine, and, as a catalyst, chlorosulphonic acid, and wherein 0.5 to 3 moles of chlorosulphonic acid are used per mole of copper phthalocyanine, and the proportion of pigment in the final reaction mixture is from 30% to 45% based on the weight of organic solvent.

2. A process as claimed in claim 1 wherein the organic solvent is nitrobenzene.

3. A process as claimed in claim 1 wherein the ratio by volume of organic solvent to chlorosulphonic acid is maintained at 30:1.

4. A process as claimed in claim 1 wherein the proportion of pigment in the final reaction mixture is from 40 to 45% by weight, based on the weight of the organic solvent.

5. A process as claimed in claim 1 wherein the halogen transfer agent is metallic iron or copper.

6. A process as claimed in claim 1 wherein the halogen transfer agent is iodine.

7. A process as claimed in claim 1 wherein the proportion of the halogen transfer agent in the reaction mixture is within the range of from 0.1 mole to 0.5 mole, based on one mole of copper phthalocyanine.

8. A process as claimed in claim 1 wherein the halogenating agent is elemental bromine or chlorine or sulphuryl chloride.

9. A process as claimed in claim 1 wherein the amount of halogenating agent is from 7 to 32 moles, per mole of copper phthalocyanine starting material.

10. A process as claimed in claim 9 wherein the proportion of halogenating agent is within the range of from 20 to 32 moles, per mole of copper phthalocyanine starting material.

11. A process as claimed in claim 1 wherein 0.75 to 1.25 moles of chlorosulphonic acid are used per mole of copper phthalocyanine.

12. A process as claimed in claim 11 wherein 1.0 mole of chlorosulphonic acid is used per mole of copper phthalocyanine.

13. A process as claimed in claim 1 wherein
  a. crude copper phthalocyanine is first slurried in the organic solvent;
  b. chlorosulphonic acid catalyst is then added and the mixture heated to a temperature within the range of from 100° to 140° C., whereat the halogen transfer agent is added;
  c. to this hot mixture, the halogenating agent is then added over 5 to 10 hours, whilst further heating the reaction mixture to a temperature within the range of from 150° to 190° C:
  d. optionally heating the mixture at a temperature within the range of from 150° to 190° C. for a further 3 to 10 hours;
  e. working-up the mixture in conventional manner.

14. A process as claimed in claim 13 wherein the temperature in step (b) is within the range of from 110° to 130° C.

15. A process as claimed in claim 13 wherein the temperature in step (c) is within the range of from 160° to 180° C.

16. A process as claimed in claim 15 wherein the temperature in step (c) is within the range of from 165° to 170° C.

* * * * *